United States Patent
Petrosius et al.

(10) Patent No.: US 7,277,791 B2
(45) Date of Patent: Oct. 2, 2007

(54) STRATEGY FOR DETECTING USE OF A BLOCK HEATER AND FOR MODIFYING TEMPERATURE-DEPENDENT VARIABLES TO ACCOUNT FOR ITS USE

(75) Inventors: Rimas L. Petrosius, Carol Stream, IL (US); James T. Beaucaire, Wheaton, IL (US); Douglas W. Villacreses, Chicago, IL (US); Michael A. Majewski, Joliet, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 5 days.

(21) Appl. No.: 11/253,475

(22) Filed: Oct. 19, 2005

(65) Prior Publication Data

US 2007/0084427 A1    Apr. 19, 2007

(51) Int. Cl.
G06F 19/00    (2006.01)
(52) U.S. Cl. ................. 701/112; 701/115; 123/142.5 E
(58) Field of Classification Search ................ 219/202, 219/494, 497, 508; 340/438, 933, 938; 123/142.5 E; 701/112, 113, 115
See application file for complete search history.

(56) References Cited

U.S. PATENT DOCUMENTS

| | | | | |
|---|---|---|---|---|
| 3,744,046 A | * | 7/1973 | Tamasi | 340/640 |
| 4,002,882 A | * | 1/1977 | McCutchen | 219/499 |
| 4,363,958 A | * | 12/1982 | Kobayashi et al. | 219/505 |
| 5,115,116 A | * | 5/1992 | Reed | 219/202 |
| 5,210,393 A | * | 5/1993 | Shier | 219/205 |
| 5,505,164 A | * | 4/1996 | Hollis | 123/41.1 |
| 5,507,251 A | * | 4/1996 | Hollis | 123/41.1 |
| 5,781,877 A | * | 7/1998 | Rachel et al. | 701/104 |
| 6,714,854 B2 | * | 3/2004 | Linenberg et al. | 701/113 |
| 7,022,943 B1 | * | 4/2006 | Barta | 219/205 |

\* cited by examiner

Primary Examiner—Stephen K. Cronin
Assistant Examiner—Katrina Harris
(74) Attorney, Agent, or Firm—Susan L. Lukasik; Elias P. Soupos; Jeffrey P. Calfa (57) ABSTRACT

A diesel engine (100) has a control system (102) that processes certain data to develop data values for one or more temperature-dependent variables, such as injection control pressure (ICP), that affect engine starting and ensuing warm-up. The control system also processes data for detecting a temperature differential in the engine indicative of a block heater (126) having been used to heat the engine prior to cranking. Upon detection of such temperature differential, the control system selects a temperature data source from multiple available temperature data sources, namely engine coolant temperature ECT, engine oil temperature EOT, and charge air temperature AIT, and processes temperature data from the selected source with additional data to develop data values for one or more of the temperature-dependent variables.

30 Claims, 4 Drawing Sheets

STRATEGY FOR DETECTING USE OF A BLOCK HEATER AND FOR MODIFYING TEMPERATURE-DEPENDENT VARIABLES TO ACCOUNT FOR ITS USE

FIELD OF THE INVENTION

This invention relates generally to internal combustion engines, especially diesel engines in motor vehicles that on occasion must be re-started in cold weather after having been shut off sufficiently long that they have lost essentially all heat and therefore have assumed essentially the prevailing cold ambient temperature.

BACKGROUND OF THE INVENTION

Diesel engines in certain motor vehicles often use a starting aid or aids, particularly when engine starting is attempted in cold weather. A starting aid is employed to provide heating that will assure combustion of injected diesel fuel by compression ignition when the engine is cranked.

One type of cold start aid is commonly referred to as a block heater. A typical block heater is an accessory device that is mounted on an engine for delivering heat to the engine when an electric cord running from the device is plugged into a nearby electrical outlet. The use of household or commercial electric power, rather than the vehicle's battery or battery bank, can deliver more heat, and without battery drain. When a vehicle has been parked and its engine shut off, a block heater can be used to maintain engine heat in cold weather. Alternatively it can be used to raise the temperature of a cold-soaked engine prior to cranking.

Glow plugs are another type of cold start aid. A glow plug starting aid system typically comprises one or more glow plugs associated with each combustion chamber, and some form of controller or control system that controls the delivery of electric current to the glow plugs from the vehicle battery or battery bank. Glow plugs typically operate only after the ignition switch has been turned on, and only for a limited amount of time.

A glow plug lamp in an instrument panel typically serves as a wait-to-start indicator to inform the driver that the glow plugs have been turned on and that he should wait to crank the engine to allow the glow plugs to be effective. The glow plugs may continue to be energized for some amount of time after the engine has been cranked and commences running under its own power. A glow plug is intended to create a hot spot in a combustion chamber whereas a block heater is typically installed in a block cooling jacket to deliver heat to engine coolant.

When an engine that has been heated by a block heater is to be started in cold weather, the temperatures of the coolant and of surfaces in contact with the coolant are generally significantly higher than those at other locations, such as in the crankcase and oil galleries.

Another device that can aid engine cold-start is a manifold air intake heater. Such a heater, when electrically energized, heats charge air in the engine intake system before entering the combustion chambers. Control of heating by an air heater may occur in coordination with, or independently of, glow plug control.

The fuel injection systems of certain diesel engines use hydraulic fluid under pressure to force fuel into engine combustion chambers. The hydraulic fluid, typically engine oil, is supplied to a respective fuel injector at each engine cylinder. When a valve mechanism of a fuel injector is operated by an electric signal from an engine control system to inject fuel into the respective cylinder, the hydraulic fluid is allowed to act on a piston in the fuel injector to force a charge of fuel into the respective combustion chamber. The pressure of the fluid, referred to as injection control pressure, or simply ICP, is also controlled by the engine control system. Because fluid viscosity is affected by temperature, it is appropriate that the control system take temperature into account when setting ICP.

Because block heaters typically elevate engine coolant temperature more significantly than engine oil temperature, a control strategy that sets certain starting parameters, intake air heater on-time and ICP for example, based only on engine coolant temperature might set them to values that are less than optimal for actual temperatures elsewhere in the engine and the prevailing ambient temperature. A block heater that has been heating a cold-soaked engine may elevate engine coolant temperature on average 45° F. higher than engine oil temperature before the engine is cranked, and if the control system sets ICP based on a temperature that is significantly different from one that accurately reflects the viscosity of the lower temperature engine oil, ICP may not be set to an optimal pressure.

In a similar way, when intake air heating and/or glow plug heating are used after block heating, their operation may not be optimized because of temperature differentials created by use of the block heater.

Heretofore, engine coolant temperature data was considered suitable by itself for engine temperature data needed by the engine control system to control temperature-dependent variables that affect the starting procedure for a cold-soaked engine. Those variables include ICP and control parameters for an intake air heater.

SUMMARY OF THE INVENTION

While the use of engine coolant temperature alone may be entirely satisfactory in warm temperature environments where starting of a diesel engine is less difficult than in cold ones, the inventors suggest that engine coolant temperature data alone is not necessarily satisfactory as engine temperature data in all potential conditions for use in an engine control system to develop appropriate data values for temperature-dependent control variables that affect the starting procedure after the engine has been cold-soaked.

A strategy that sets starting parameters using only engine coolant temperature to temperature-compensate certain temperature variables may in hindsight be considered as a compromise for addressing engine starting both with and without block pre-heating. Because cold-starting of a diesel engine is inherently difficult, compromising of an engine's cold-start capability should be avoided.

The present invention relates to a new and improved strategy that does not compromise that capability.

One general aspect of the present invention relates to an internal combustion engine comprising a control system comprising a processor for processing certain data to develop data values for one or more temperature-dependent variables that affect engine starting and ensuing warm-up. The processor also processes data for detecting a temperature differential in the engine indicative of a block heater having been used to heat the engine prior to cranking. Upon detection of such temperature differential, the processor selects a temperature data source from multiple available temperature data sources and processes temperature data from the selected source with additional data to develop data values for one or more of the temperature-dependent variables.

Another general aspect relates to a method for modifying one or more temperature-dependent variables in a control system of an internal combustion engine during a phase of operation that comprises heating a limited portion of a cold engine block by a heat source prior to engine cranking followed by warm-up running once the cranking has started the engine running under its own power.

The method comprises processing data for detecting heating of a cold engine block by the heat source that creates a defined temperature differential between engine oil and engine coolant, and upon detection of such a temperature differential, selecting a temperature data source from multiple available temperature data sources and processing temperature data from the selected source with additional data to develop data values for one or more of the temperature-dependent variables.

Still another general aspect relates to a method for modifying one or more temperature-dependent variables in an engine control system during a phase of operation that comprises heating of a portion of a cold engine block by a heat source prior to engine cranking followed by warm-up running once the cranking has started the engine running under its own power.

The method comprises processing engine temperature data from more than one available temperature data source for detecting a temperature differential in the engine created by such heating prior to engine cranking, and when a defined temperature differential affecting the one or more temperature-dependent variables is detected, modifying the one or more temperature-dependent variables to account for the effect of heating that has created the defined temperature differential.

Another aspect of the method indicates heating of a portion of a cold engine block by a heat source prior to engine cranking for use in subsequent control of engine operation. Temperature data representing temperature at different locations in the engine is obtained by calculating the difference between the temperature at one location and the temperature at another location. The calculated difference is compared to a defined threshold that distinguishes heating by the heat source from non-heating by the heat source, with heating by the heat source being indicated when the calculated difference exceeds the defined threshold.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
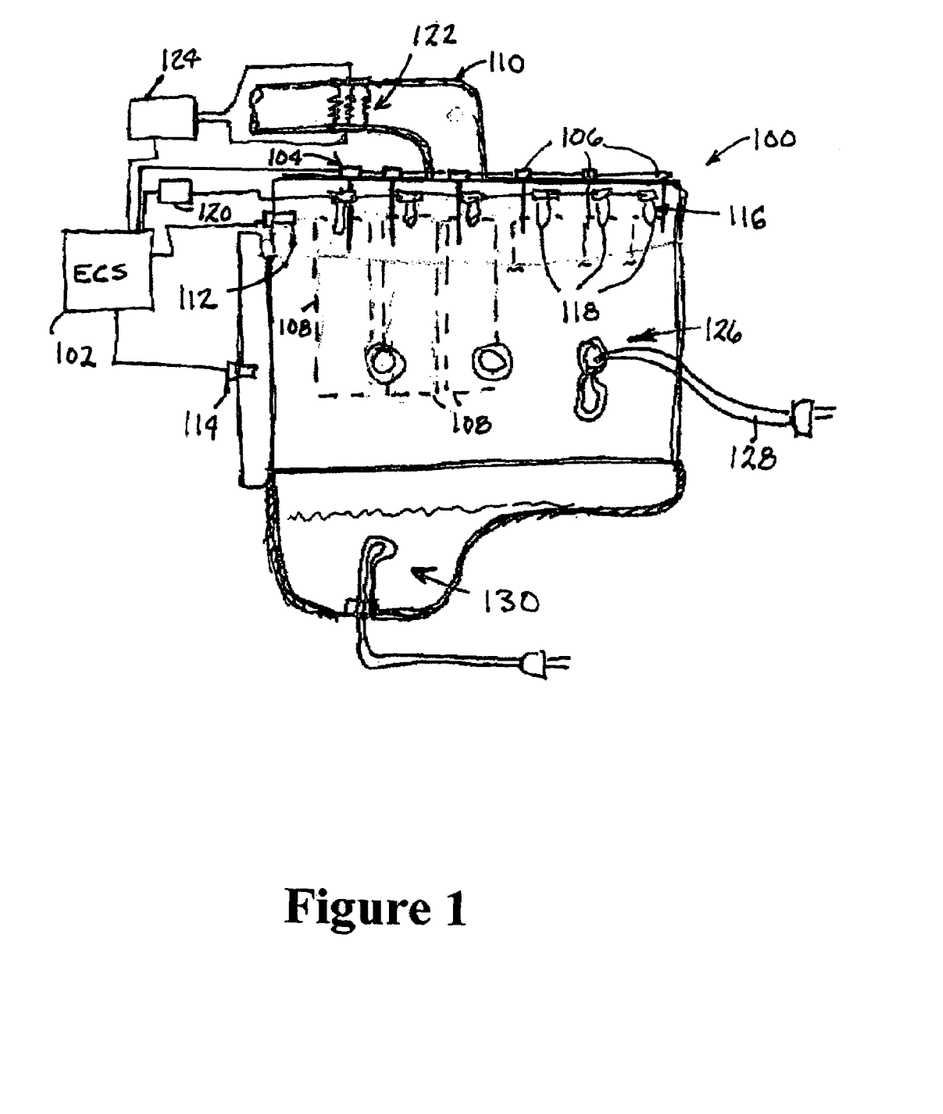
FIG. 1 is a somewhat schematic side elevation view of a diesel engine embodying principles of the present invention.

A contemporary diesel engine 100, like the one shown in FIG. 1, comprises an engine control system 102 that comprises one or more processors that control various systems and devices, one of which is a fuel injection system 104 controlled by a fuel control strategy. Fuel injection system 104 comprises fuel injectors 106 that inject fuel into engine cylinders 108 where the injected fuel combusts to power the engine. Charge air enters cylinders 108 through an intake system 110.

Engine 100 comprises a cooling system and a lubrication system. Temperature of coolant in the cooling system is measured by a coolant temperature sensor 112 associated with the coolant system at a suitable location. Temperature of oil in the lubrication system is measured by an oil temperature sensor 114 associated with the lubrication system at a suitable location. The two sensors provide coolant temperature data and oil temperature data respectively to control system 102.

A glow plug heater system 116 comprises glow plugs 118 associated with cylinders 108. Control system 102 controls the operation of the glow plugs by a control strategy that energizes the glow plugs through a relay 120

An intake air heater 122 is associated with intake system 110. Control system 102 controls the operation of heater 122 by a control strategy that energizes the heater through a relay 124.

FIG. 1 also shows a block heater 126 associated with the engine block. When block heater 126 is used, an electric cord 128 running from the heating element is plugged into a nearby electrical outlet. Once the block has been heated sufficiently, the block heater is unplugged. An engine may also have a crankcase heater 130 that when used can help keep motor oil in the crankcase warmer than ambient air, but because cold oil is not especially fluid, and an oil pump must be operated to move it from the crankcase into the engine block, heater 130 has little effect on heating the engine block.

Figure 2:
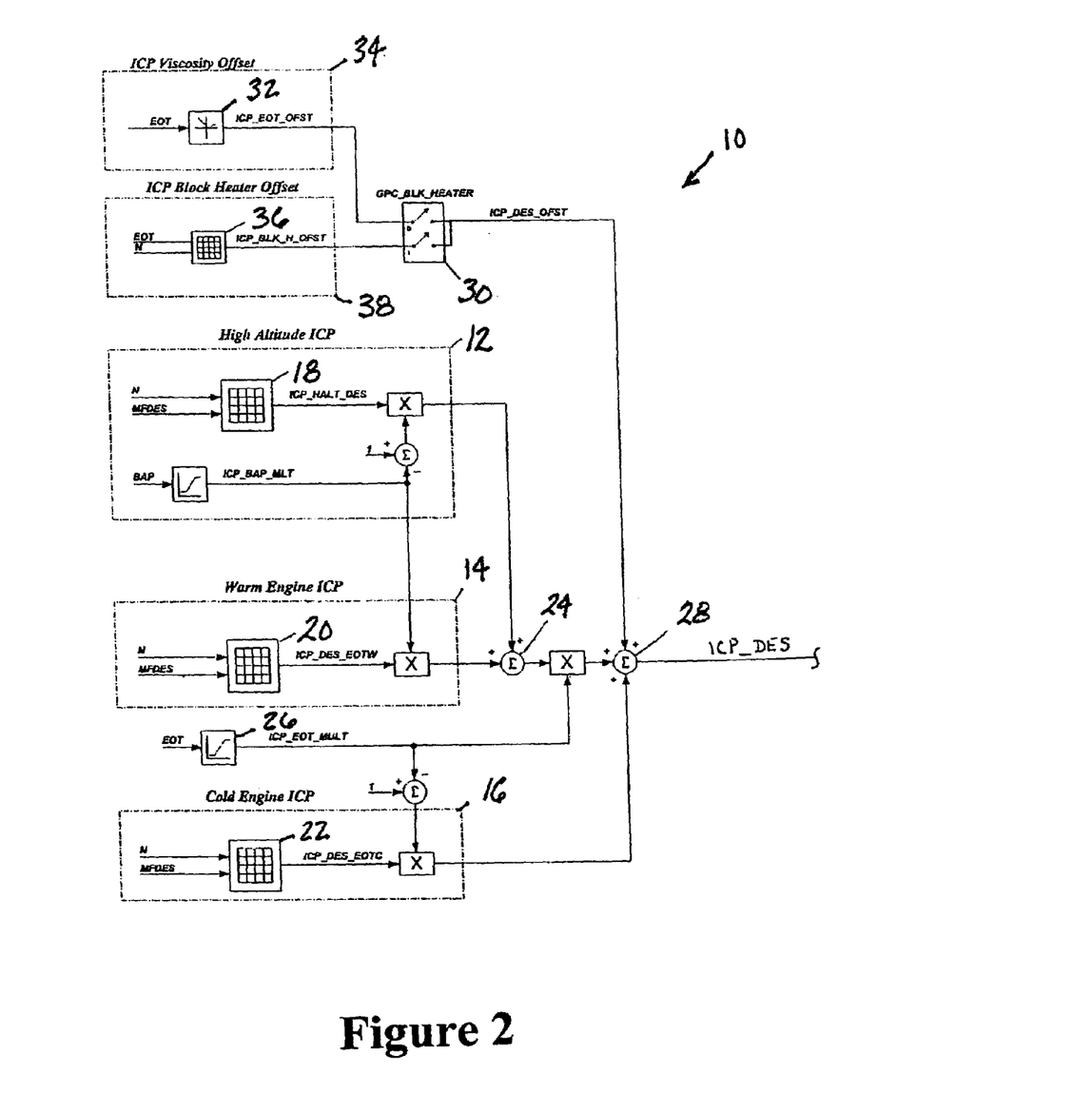
FIG. 2 is a diagram of a portion of an exemplary embodiment of software strategy relating to fueling a diesel engine as a result of detection of engine block heating in accordance with principles of the present invention.

FIG. 2 shows a sub-strategy 10 of the fuel control strategy relating to control of ICP.

Sub-strategy 10 repeatedly iterates during processing to continually calculate data values for desired ICP (ICP_DES) based High Altitude ICP, Warm Engine ICP, and Cold Engine ICP tables, 12, 14, 16. Input data representing engine speed N and desired engine fueling MFDES are processed to select from a respective map 18, 20, 22 in each table a respective data value. In the case of tables 12 and 14, the selected data values from maps 18 and 20 are compensated for barometric absolute pressure in respective ways, as shown, by a parameter BAP before the compensated data values are summed by a summing function 24.

Engine oil temperature is used to compensate both the sum from summing function 24 and the selected data value from map 22 in respective ways, as shown, by the selection of a data value from a map 26 using the value of a parameter EOT for engine oil temperature to make the selection. The compensated value from table 16 and the compensated sum from summing function 24 are summed by a summing function 28.

A further addend for summing by summing function 28 is the data value for a parameter ICP_DES_OFST. The particular manner for calculating a data value for ICP_DES_OFST depends on the state of a switch function 30 that distinguishes between an engine that been block-heated before cranking and an engine that has not.

A non-heated engine causes the data value for ICP_DES_OFST to be selected from a map 32 of an ICP Viscosity Offset table 34 based on engine oil temperature EOT.

A heated engine causes the data value for ICP_DES_OFST to be selected from a map 36 of an ICP Block Heater Offset table 38 based on engine oil temperature EOT and engine speed N.

When the engine can be started without block-heating, ICP_DES_OFST adds an offset to the basic ICP resulting from processing engine speed N, desired fueling MFDES, barometric absolute pressure BAP, and engine oil temperature EOT using tables 12, 14, and 16 and associated processing strategy. As the engine begins to run under its own power and warms up, the basic strategy changes desired ICP in ways appropriate to changes in those parameters. Although engine oil temperature EOT is used in setting data values for basic ICP, the effect of changing oil viscosity on desired ICP as the engine warms up is more fully accounted for by use of table 34 to compensate basic ICP for changing oil temperature by adding a viscosity offset. In general the offset diminishes as oil temperature increases.

When the engine is started after block-heating, ICP_DES_OFST adds a different offset to the basic ICP resulting from processing engine speed N, desired fueling MFDES, barometric absolute pressure BAP, and engine oil temperature EOT using tables 12, 14, and 16 according to their associated processing strategy. Instead of using only engine oil temperature EOT to determine the offset after the engine has started and begun to run under its own power, sub-strategy 10 uses both engine oil temperature EOT and engine speed N by using a selection from map 36 as the offset value. Here too, the offset generally diminishes as oil temperature increases.

Each of the various maps shown is typically populated for a particular engine model during engine development to assure optimal values for various combinations of input data. The parameter ICP_DES is further processed as an input to a closed-loop control strategy for control of ICP. Details of that closed-loop control strategy need not be discussed here, but they are described in other patent filings by the assignee.

Figure 3:
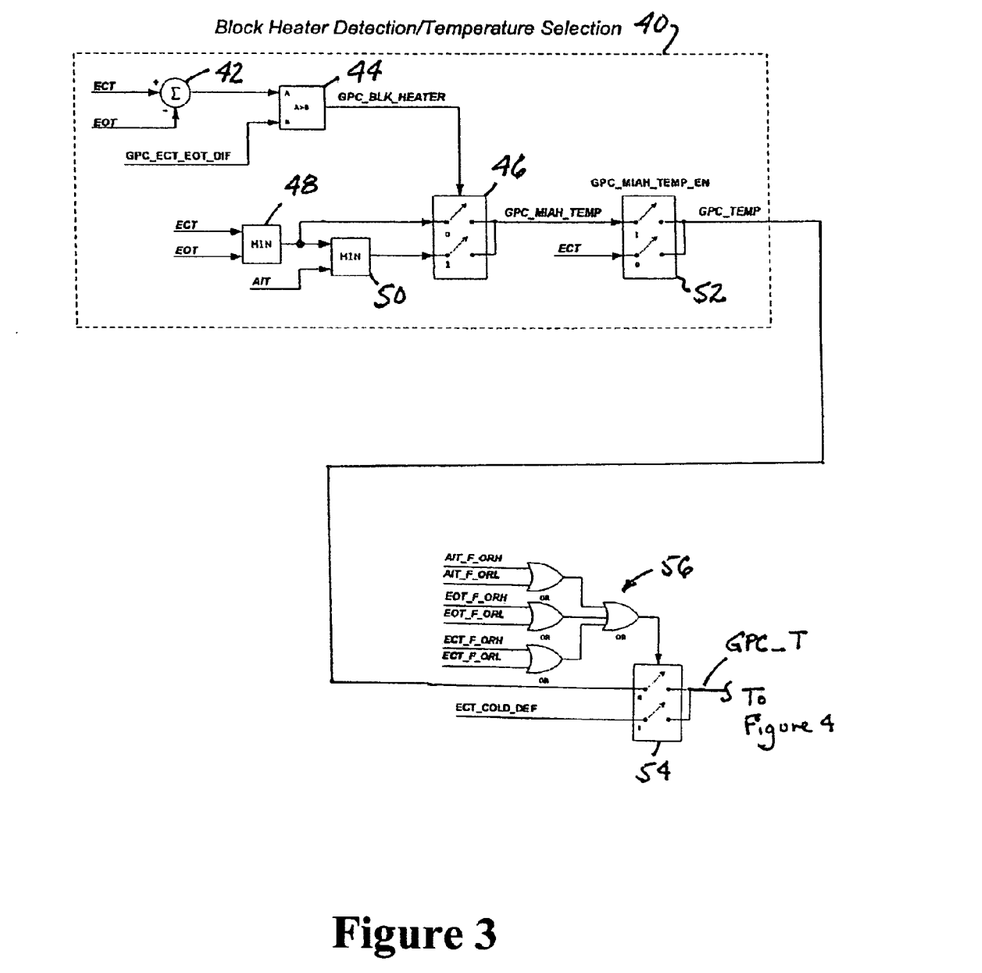
FIG. 3 is a diagram of an exemplary embodiment of software strategy relating to detection of heating in the engine block in accordance with principles of the present invention.

FIG. 2 further shows that a parameter GPC_BLK_HEATER sets the state of switch function 30. FIG. 3 shows how GPC_BLK_HEATER is determined.

A sub-strategy entitled Block Heater Detection/Temperature Selection 40 processes various temperature data that includes engine oil temperature EOT and temperature data available from additional sources. One additional source is a source of engine coolant temperature data representing the temperature of liquid coolant, ECT, that circulates from the engine block to a radiator and back to the engine block when the engine is running. Another additional source is a source of intake air temperature representing the temperature of charge air AIT entering the engine.

A subtraction function 42 calculates the difference between engine oil temperature EOT and engine coolant temperature ECT by subtracting the former from the latter. The result is processed by a comparison function 44 that compares the result with a defined differential GPC_ECT_EOT_DIF. Whenever engine coolant temperature ECT exceeds engine oil temperature by more than the defined differential GPC_ECT_EOT_DIF, function 44 sets the data value for GPC_BLK_HEATER to a logic "1"; otherwise the data value is a logic "0".

GPC_BLK_HEATER also sets the condition of a switch function 46 in sub-strategy 40 that determines how a data value for a parameter GPC_MIAH_TEMP is determined.

Engine coolant temperature ECT, engine oil temperature EOT, and charge air temperature AIT are processed using two minimum value selection functions 48, 50. Function 48 selects the smaller of engine coolant temperature ECT and engine oil temperature EOT. The selection is one of two that are presented to switch function 46. Function 50 selects the smaller of the selection made by function 48 and charge air temperature AIT, in effect selecting the smallest of engine coolant temperature ECT, engine oil temperature EOT, and charge air temperature AIT.

When GPC_BLK_HEATER has been set to a logic "1", it sets switch function 46 to a state that causes the smaller of engine coolant temperature and engine oil temperature to be processed as GPC_MIAH_TEMP. When GPC_BLK_HEATER is a logic "0", it sets switch function 46 to a state that causes the smallest of engine coolant temperature ECT, engine oil temperature EOT, and charge air temperature AIT to be processed as the data value for GPC_MIAH_TEMP.

The state of a switch function 52 is set by a parameter GPC_MIAH_TEMP_EN. When a data value for GPC_MIAH_TEMP_EN is a logic "1", the switch function selects the data value for GPC_MIAH_TEMP as the data value for a parameter GPC_TEMP. When a data value for GPC_MIAH_TEMP_EN is a logic "0", the switch function selects the data value for ECT as the data value for GPC_TEMP. The data value for GPC_MIAH_TEMP_EN is set to a logic "1" when a manifold intake air heater is used in conjunction with the block heater.

The sources used for the selection made by switch function 52 are checked by several logic functions, generally designated by the reference numeral 56, for rationality by comparing the data value provided by each source for compliance with an allowable range of values defined by respective high and low limits of the respective range. Any out of range value causes a switch function 54 to select a default value, ECT_COLD_DEF, instead of the value for GPC_TEMP, as the data value for a parameter GPC_T processed in further heater control.

Figure 4:
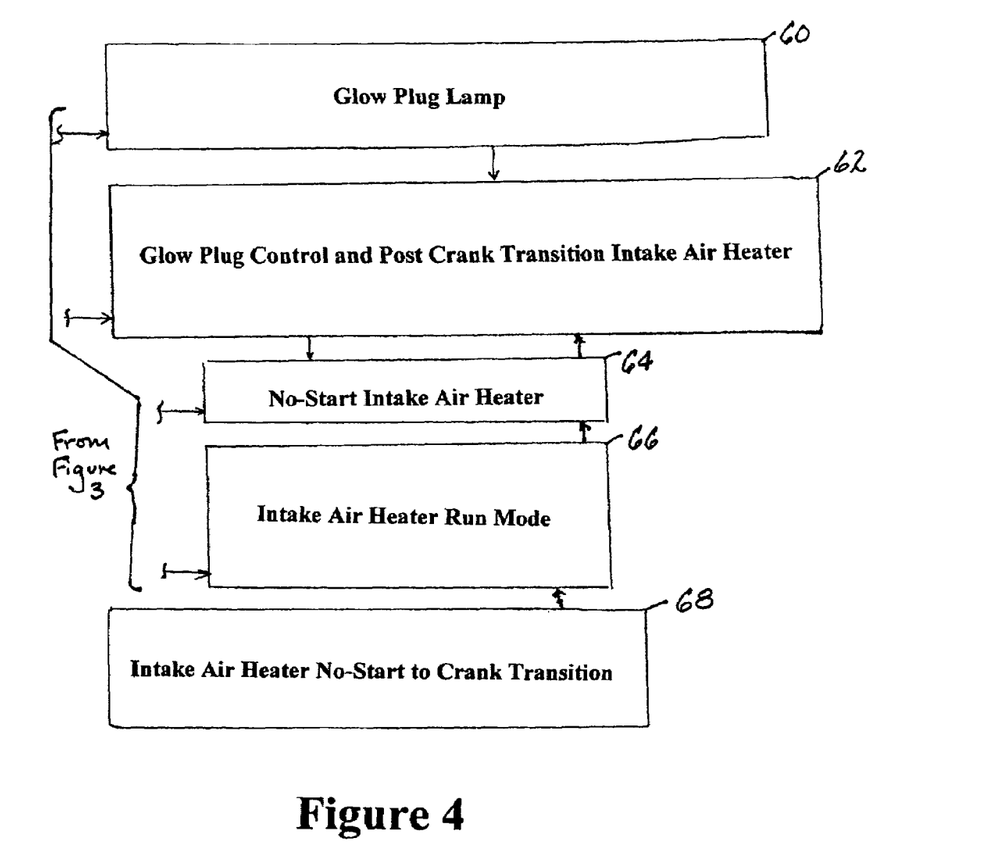
FIG. 4 is a block diagram of a portion of a strategy relating to further heating control as a result of detection of engine block heating in accordance with principles of the present invention.

FIG. 4 shows generally how the glow plugs and manifold air intake heater are controlled. GPC_T forms an input to sub-strategies Glow Plug Lamp 60, Glow Plug Control and Post-Crank Transition Intake Air Heater 62, No-Start Intake Air Heater 64, and Intake Air Heater Run Mode 66. Those four sub-strategies have certain interactions with each other. Intake Air Heater No-Start to Crank Transition sub-strategy 68 also acts on Intake Air Heater Run Mode 66.

The sub-strategies execute in the following order to control block heating and intake air heating: 1) Block Heater Detection/Temperature Selection 40; Glow Plug Control and Post Crank Transition Intake Air Heater 62; No-Start Intake Air Heater 64; Intake Air Heater No-Start to Crank Transition 68; Intake Air Heater Run Mode 66; and Glow Plug Lamp 60.

Manifold air intake heating is controlled through sub-strategy 62 with the control sequence for the air heater being: No-Start Air Heater 64; Intake Air Heater No-Start to Crank Transition 68; Post-Crank Transition Intake Air Heater 62; and Intake Air Heater Run Mode 66.

The No-Start Intake Air Heater sub-strategy sets the maximum allowed time that air heater will be engaged prior to cranking.

Crank initiation disables the output of the intake air heater for a specified time to reduce battery drain.

The Intake Air Heater Run Mode sub-strategy sets the time allowed for the air intake heater to remain ON in RUN mode for white smoke control.

The difference between engine coolant temperature ECT and engine oil temperature EOT is used as a determinant of block heating. When the difference is greater than the defined differential GPC_ECT_EOT_DIF, the lowest one of engine coolant temperature, engine oil temperature, or ambient intake temperature is selected, and serves as the temperature used to control glow plug operation and intake air heater operation, provided that there are no ambient intake temperature out-of-range faults, engine oil temperature out-of-range faults, or engine coolant temperature out-of-range faults.

Glow plug lamp control and glow plug control are independent of each other. However, both are dependent on engine coolant temperature ECT, barometric absolute pressure BAP, and battery voltage. Glow plug diagnostics are used to ensure that a glow plug relay is functioning properly and that the glow plugs are receiving proper voltage supply.

By determining the difference between engine coolant temperature and engine oil temperature, and then comparing the difference with a threshold that distinguishes between use and non-use of a block heater, the inventive strategy has the ability to detect the application or non-application of a engine block heater and the ability to select starting parameter values best suited for an engine start sequence when use of a block heater has been detected and to select starting parameter values best suited for an engine sequence when no use of a block heater has been detected.

In other words, the new software strategy allows the selection of optimum starting parameters (examples of which are intake air heater time and ICP pressure) regardless of the application or non-application of a block heater.

While a presently preferred embodiment of the invention has been illustrated and described, it should be appreciated that principles of the invention apply to all embodiments falling within the scope of the following claims.

What is claimed is:

1. An internal combustion engine comprising:
   a control system comprising a processor for processing certain data to develop data values for one or more temperature-dependent variables that affect engine starting and ensuing warm-up, including processing data for detecting a temperature differential in the engine indicative of a block heater having been used to heat the engine prior to cranking, and upon detection of such temperature differential, for selecting a temperature data source from multiple available temperature data sources and processing temperature data from the selected source with additional data to develop data values for one or more of the temperature-dependent variables.

2. An engine as set forth in claim 1 wherein for detecting a temperature differential in the engine indicative of a block heater having been used to heat the engine prior to cranking, the processor is configured to comprise processing steps for processing temperature data from more than one temperature data source.

3. An engine as set forth in claim 2 wherein a first temperature data source comprises an engine coolant temperature data source, a second temperature data source comprises an engine oil temperature data source, and the processing steps for detecting a temperature differential in the engine indicative of a block heater having been used to heat the engine prior to cranking comprise processing engine coolant temperature data from the engine coolant temperature data source and engine oil temperature data from the engine oil temperature data source.

4. An engine as set forth in claim 3 wherein the processing steps for detecting a temperature differential in the engine indicative of a block heater having been used to heat the engine prior to cranking comprise calculating the difference between the engine coolant temperature data and the engine oil temperature data, and comparing the calculated difference to a threshold for distinguishing detection of the temperature differential from non-detection of the temperature differential.

5. An engine as set forth in claim 2 wherein the processor is configured to comprise further processing steps that result in selecting a temperature data source from the multiple available temperature data sources that include those sources whose temperature data was processed to detect the temperature differential and at least one additional temperature data source whose temperature data was not processed to detect the temperature differential.

6. An engine as set forth in claim 5 wherein the multiple available temperature data sources comprise an engine coolant temperature data source providing engine coolant temperature data, an engine oil temperature data source providing engine oil temperature data, and an air temperature data source providing data correlated with temperature of charge air passing through an air intake system of the engine.

7. An engine as set forth in claim 6 wherein the further processing steps are configured for comparing temperature data values from the engine coolant temperature data source, from the engine oil temperature data source, and from the air temperature data source, and for selecting as the temperature data source whose temperature data is processed with additional data to develop data values for one or more of the temperature-dependent variables, the one of the compared temperature data sources whose temperature data represents the lowest temperature of the compared temperature data values.

8. An engine as set forth in claim 1 wherein the processor is configured to comprise processing steps for processing temperature data from the selected source with additional data to develop data values for control of heating by one or more heating devices on the engine.

9. An engine as set forth in claim 8 wherein the one or more heating devices comprise glow plugs.

10. An engine as set forth in claim 8 wherein the one or more heating devices comprise an electrically energized heater that heats charge air in an air intake system.

11. An engine as set forth in claim 1 including a fuel injection system that injects fuel into engine combustion chambers at pressure that is controlled by one of the one or more temperature dependent variables, and wherein the processor is configured to comprise processing steps that upon detection of the temperature differential, process temperature data from one of the sources with additional data to develop data values for control of pressure at which fuel is injected into the combustion chambers.

12. An engine as set forth in claim 11 including a modifier data map containing modifier data values for modifying the additional data, each modifier data value being correlated with a respective set of data values representing respective ranges of engine oil temperature and of engine speed, and wherein the processor is configured to comprise processing steps for causing a modifier data value to be selected from the map using current engine oil temperature and current engine speed and then used to modify the additional data.

13. An engine as set forth in claim 12 including one or more additional maps for providing data values for the additional data, and wherein the processor is configured to comprise processing steps for modifying a data value for the additional data by causing a modifier data value from the modifier data map to be algebraically summed with a data value for the additional data.

14. A method for modifying one or more temperature-dependent variables in a control system of an internal combustion engine during a phase of operation that comprises heating a limited portion of a cold engine block by a heat source prior to engine cranking followed by warm-up running once the cranking has started the engine running under its own power, the method comprising:

processing data for detecting heating of a cold engine block by the heat source that creates a defined temperature differential between engine oil and engine coolant prior to engine cranking, and upon detection of such a temperature differential, selecting a temperature data source from multiple available temperature data sources and processing temperature data from the selected source with additional data to develop data values used for one or more of the temperature-dependent variables when the engine is running under its own power.

15. A method as set forth in claim 14 wherein the step of processing data for detecting such heating by the heat source comprises processing temperature data from more than one temperature data source.

16. A method as set forth in claim 15 wherein the step of processing temperature data from more than one temperature data source comprises processing engine coolant temperature data from an engine coolant temperature data source and engine oil temperature data from an engine oil temperature data source.

17. A method as set forth in claim 16 wherein the step of processing engine coolant temperature data and engine oil temperature data comprises calculating the difference between the engine coolant temperature data and the engine oil temperature data, and comparing the calculated difference to a data value representing the defined temperature differential.

18. A method as set forth in claim 15 wherein the step of selecting a temperature data source from multiple available temperature data sources comprises selecting a temperature data source from multiple available temperature data sources that include temperature data sources whose temperature data was processed to detect the defined temperature differential and at least one additional temperature data source whose temperature data was not processed to detect the defined temperature differential.

19. A method as set forth in claim 18 wherein the step of selecting a temperature data source from multiple available temperature data sources comprises selecting from an engine coolant temperature data source providing engine coolant temperature data, an engine oil temperature data source providing engine oil temperature data, and an air temperature data source providing data correlated with temperature of charge air passing through an air intake system of the engine.

20. A method as set forth in claim 19 wherein the step of selecting a temperature data source from multiple available temperature data sources comprises comparing temperature data values from the engine coolant temperature data source, from the engine oil temperature data source, and from the air temperature data source, and selecting as the temperature data source whose temperature data is processed with additional data to develop data values for one or more of the temperature-dependent variables, the one of the compared temperature data sources whose temperature data represents the lowest temperature of the compared temperature data values.

21. A method as set forth in claim 14 wherein the step of processing temperature data from the selected source with additional data to develop data values for one or more of the temperature-dependent variables comprises developing data values for control of heating by a different heat source from that used prior to cranking.

22. A method as set forth in claim 14 wherein the step of processing temperature data from the selected source with additional data to develop data values for one or more of the temperature-dependent variables comprises developing data values for control of heating by one or more glow plugs.

23. A method as set forth in claim 14 wherein upon detection of the defined temperature differential, temperature data from one of the available temperature sources is processed with the additional data to develop data values for control of pressure at which fuel is injected into engine combustion chambers.

24. A method as set forth in claim 23 wherein the step of developing data values for control of pressure at which fuel is injected into engine combustion chambers comprises causing a modifier data value from a map containing modifier data values each correlated with a respective set of data values representing respective ranges of engine oil temperature and of engine speed to be selected by current engine oil temperature data and current engine speed data and then processed with the additional data to modify the additional data.

25. A method for modifying one or more temperature-dependent variables in an engine control system during a phase of operation that comprises heating of a portion of a cold engine block by a heat source prior to engine cranking followed by warm-up running once the cranking has started the engine running under its own power, the method comprising:

processing engine temperature data from more than one available temperature data source for detecting a temperature differential in the engine created by such heating prior to engine cranking, and when a defined temperature differential affecting the one or more temperature-dependent variables is detected, modifying the one or more temperature-dependent variables to account for the effect of heating that has created the defined temperature differential.

26. A method as set forth in claim 25 wherein the step of modifying the one or more temperature-dependent variables to account for the effect of heating that has created the defined temperature differential comprises modifying a particular temperature-dependent variable by temperature data from a temperature data source when a defined temperature differential that affects the particular variable has been detected.

27. A method as set forth in claim 26 wherein the step of modifying a particular temperature-dependent variable by temperature data from a temperature data source when a defined temperature differential that affects the particular variable has been detected comprises modifying pressure at which fuel is injected into combustion chambers of the engine when a defined temperature differential that affects that pressure has been detected.

28. A method as set forth in claim 26 wherein the step of modifying a particular temperature-dependent variable by temperature data from a temperature data source when a defined temperature differential that affects the particular variable has been detected comprises controlling a heat source different from the one used prior to engine cranking when a defined temperature differential that affects heating by the different heat source has been detected.

29. A method for indicating heating of a portion of a cold engine block by a heat source prior to engine cranking for use in subsequent control of engine operation, the method comprising:

prior to engine cranking, processing temperature data representing temperature at different locations in the engine by calculating the difference between the temperature at one location and the temperature at another location, comparing the calculated difference to a defined threshold that distinguishes heating by the heat source from non-heating by the heat source, and indicating heating by the heat source when the calculated difference exceeds the defined threshold.

30. A method as set forth in claim 29 wherein the step of calculating the difference between the temperature at one location and the temperature at another location comprises calculating the difference between engine coolant temperature data and engine oil temperature data.

\* \* \* \* \*